United States Patent
Libov et al.

(10) Patent No.: US 6,710,620 B2
(45) Date of Patent: Mar. 23, 2004

(54) BUS INTERFACE FOR I/O DEVICE WITH MEMORY

(75) Inventors: Mark Libov, Beer-Sheva (IL); Stan Sacharen, Kfar-Siba (IL); Mark Kaplun, Modi'in (IL); Noam Ben-Moyal, Petah-Tiqua (IL)

(73) Assignee: ADC Telecommunications Israel, Ltd., Herzliya (IL)

( * ) Notice: Subject to any disclaimer, the term of this patent is extended or adjusted under 35 U.S.C. 154(b) by 0 days.

(21) Appl. No.: 09/804,931

(22) Filed: Mar. 13, 2001

(65) Prior Publication Data

US 2002/0158661 A1 Oct. 31, 2002

(Under 37 CFR 1.47)

(51) Int. Cl.[7] .................................................. G06F 7/38
(52) U.S. Cl. ............................... 326/37; 326/41; 326/47
(58) Field of Search ............................. 326/39, 41, 47, 326/37

(56) References Cited

U.S. PATENT DOCUMENTS

| 4,905,182 | A  |   | 2/1990 | Fitch et al. |
| 5,444,852 | A  | * | 8/1995 | Nakabayashi ............... 395/823 |
| 6,011,791 | A  | * | 1/2000 | Okada et al. ............... 370/289 |
| 6,237,054 | B1 | * | 5/2001 | Freitag, Jr. .................. 710/72 |

FOREIGN PATENT DOCUMENTS

| EP | 0 351 984    | 1/1990 |
| JP | 60 005369 A  | 1/1985 |

* cited by examiner

*Primary Examiner*—Michael Tokar
(74) *Attorney, Agent, or Firm*—Fogg and Associates, LLC; Laura A. Ryan

(57) ABSTRACT

An electronic system is provided. The electronic system includes a logic device and at least one input/output interface coupled to the logic device. The electronic system further includes an input/output (I/O) device with memory coupled to the at least one input/output interface, wherein the memory of the I/O device is mapped as an address space region that is directly readable and writable by a processor.

26 Claims, 2 Drawing Sheets

BUS INTERFACE FOR I/O DEVICE WITH MEMORY

TECHNICAL FIELD

The present invention relates generally to the field of computer systems and, in particular, to the transfer of data to and from a memory of an input/output device by a central processing unit.

BACKGROUND

When transferring data between a processor and an input/output (I/O) device having its own memory such as an independent direct memory access (IDMA) device special software drivers and software are required. A special software driver is required when connecting the I/O device to the processor's communication bus. In addition software is required to communicate with the I/O device. Writing to an area in an I/O device is not achieved using a simple memory mapped access. A function call is required with the destination address and the data as the parameters. A read is handled similarly with a function call with the source address as a parameter. Each function call adds a request, parameter pushing and return instructions to every read and/or write operation. Every time the processor communicates with the I/O device to perform a read or write operation a function call is invoked. When a series of read/writes are required the process becomes cumbersome.

Another difficulty in communicating data to an I/O device having its own memory is when multiple processes are running simultaneously. For example, when there is contention between processes, data may be written to the wrong address because there is no arbitration between the function calls. System developers have difficulty simulating and debugging systems containing I/O devices having their own memory and these types of errors may go undetected. Simulating and debugging are more difficult than with standard memory devices because the software to support the function calls associated with communicating with the I/O device are not always well documented. The process of determining what steps, e.g., function calls were taken to communicate with the I/O device and write appropriate code to get the data in the correct place is time consuming.

For the reasons stated above, and for other reasons stated below which will become apparent to those skilled in the art upon reading and understanding the present specification, there is a need in the art for improvements in bus interfaces for I/O devices having their own memory in CPU systems.

SUMMARY

The above mentioned problems with the transfer of data between an I/O device and a CPU and other problems are addressed by embodiments of the present invention and will be understood by reading and studying the following specification.

In one embodiment, an electronic system is provided. The electronic system includes a logic device and at least one input/output interface coupled to the logic device. The electronic system further includes an input/output (I/O) device with memory coupled to the at least one input/output interface, wherein the memory of the I/O device is mapped as an address space region that is directly readable and writable by a processor.

In another embodiment, an electronic system is provided. The electronic system includes a communication bus, a processor coupled to the communication bus and at least one memory device coupled to the communication bus. The electronic system further includes a logic device coupled to the communication bus and at least input/output interface coupled to the logic device. In addition, the electronic system includes an input/output (I/O) device with memory coupled to the at least one input/output interface. The memory of the I/O device is mapped as a single address space region and the at least one memory device and the memory of the I/O device are directly readable and writable by the processor.

In a further embodiment, a method of writing data to memory of a peripheral device coupled to a communication bus is provided. The memory is mapped as an address space region and the address space is writable and readable by a processor associated with the communication bus. The method includes monitoring the communication bus and decoding an address signal on the communication bus. When the address signal is associated with the memory of the peripheral device, generating at least one control signal. The method further includes providing the control signal to an input/output interface associated with the peripheral device and writing to the memory of the peripheral device.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
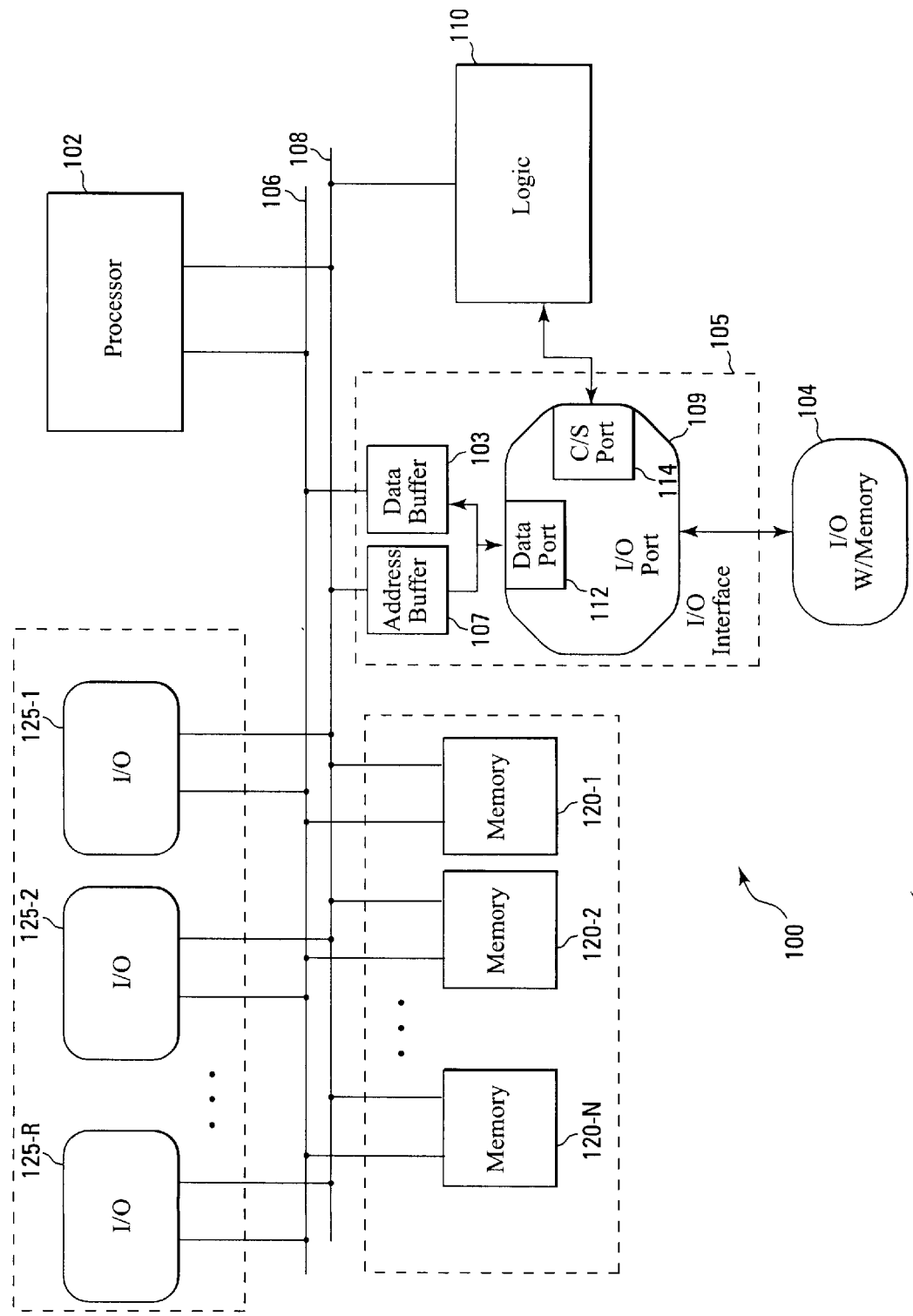
FIG. 1 is a block diagram of one embodiment of a computer system with an input/output interface according to the teachings of this invention.

FIG. 1 is a block diagram of one embodiment of a computer system indicated generally at 100 having an input/output interface 105 and constructed according to the teachings of the present invention. Computer system 100 includes a processor 102 coupled to an address bus 108 and a data bus 106. In one embodiment, address bus 108 and data bus 106 comprise a single bus that is multiplexed between address and data functions. In one embodiment, data bus 106 is a bidirectional data bus. Computer system 100 includes an input/output (I/O) device 104 that includes its own memory. I/O device 104 is coupled to input/output interface 105. In one embodiment, I/O device 104 is a digital signal processor (DSP). In another embodiment, I/O device 104 is one of the family of 21ADSPXXX devices manufactured by Analog Devices Inc., Norwood, Mass., an ATM Port Control device manufactured by Lucent Technologies, Inc., Murray Hill, N.J., or the like.

Computer system 100 includes a logic device 110 coupled to address bus 108 and input/output interface 105. Logic device 110 monitors signals on the address bus 108 and detects address signals associated with the memory of I/O device 104. In one embodiment, logic device 110 comprises a programmable array logic device, a field programmable gate array device or the like. In another embodiment, logic device 110 comprises a chip select logic device. In one embodiment, logic device 110 monitors signals on address bus 108 and detects address signals associated with the memories of a plurality of I/O devices.

Input/output interface 105 is coupled to data bus 106, address bus 108 and I/O device 104. In one embodiment, input/output interface 105 includes an address buffer 107 coupled to address bus 108 and a data buffer 103 coupled to data bus 106. In one embodiment, data buffer 103 is a bidirectional data buffer. In one embodiment, input/output interface 105 further includes an input/output port 109 coupled to address buffer 107 and data buffer 103. In one embodiment, input/output port 109 includes a data port 112. In another embodiment, input/output port 109 includes a control signal (c/s) port 114.

In one embodiment, computer system 100 includes one or more memory devices 120-1 to 120-N coupled to address bus 108 and data bus 106. In one embodiment, at least one of memory devices 120-1 to 120-N comprises a random access memory (RAM) device. In one embodiment, at least one of memory devices 120-1 to 120-N comprises a chip select memory device. In one embodiment, computer system 100 includes one or more input/output (I/O) devices 125-1 to 125-R coupled to address bus 108 and data bus 106.

In operation, processor 102 reads from and writes to the memory of I/O device 104. The memory of I/O device 104 is mapped as an address space region and logic device 110 monitors address bus 108 for addresses associated with the memory of I/O device 104. Logic device 110 is pre-programmed to know the addresses assigned to the memory of I/O device 104. In order to detect the addresses, logic device 110 decodes the addresses. When logic device 110 detects an address associated with the memory of I/O device 104, logic device 110 generates control signals that enable write to and read from operations via input/output interface 105. The control signals enable address buffer 107 to be driven to input/output port 109. In one embodiment, logic device 110 is a chip select logic device and reads address information on the address bus 108 and generates a chip select signal so as to enable the input/output interface 105. In a write operation, logic device 110 enables data buffer 103 to transfer data to input/output port 109. In a read operation, logic device 110 enables input/output port 109 to transfer data to data buffer 103.

In another embodiment, processor 102 reads from and writes to the memory of a plurality of I/O devices, such as I/O device 104. The memories of the plurality of I/O devices are mapped as address space regions and logic device 110 monitors address bus 108 for addresses associated with the plurality of I/O devices.

The memory of I/O device 104 is mapped as an address space region similar to memory devices 120-1 to 120-N. As a result of this mapping, function calls to write to or read from the memory of I/O device 104 are not required. Processor 102 is not required to perform additional steps in order to communicate with the memory of I/O device 104. The memory of I/O device 104 is treated like any other memory mapped access device coupled to address bus 108 and data bus 106.

With the input/output interface 105 and logic device 110 the entire input/output address space which includes input/output interface 105 and I/O device 104 is memory mapped and reading to and writing from the memory of the I/O device are handled the same as any other memory variable.

For example:

read: x=idma.data;

write: idma_data=x;

In this embodiment, the memory space of I/O device 104 is accessed as regular memory, e.g. random access memory (RAM), and is representable as a structure. This allows a label to be attached to each register instead of having to calculate memory offsets, e.g.,

```
typedef struct
{
    int         counter;
    Int         alarm;
    char[25]    message;
} IDMA_IO_SPACE;
```

This method of defining the input/output interface 105 lends itself to simplified code maintenance and documentation.

When simulating the input/output interface 105 in a workstation, the input/output interface 105 is mapped to a standard memory address such as a random access memory (RAM) address. For example:

int[80*1024] idma_simulation;

IDMA_IO_SPACE idma_ptr;

idma_ptr=(IDMA_IO_SPACE*) idma_simulation;

A programmer can simulate the input/output interface with instructions such as:

idma_ptr->counter=25

During a simulation the input/output interface address space can be viewed to ensure that the data has been written to the correct fields. Messages or data that has been written into a queue can be viewed using a memory dump. In addition, debugging of the input/output interface 105 is performed in a quick and efficient manner. This method of implementing the software facilitates software debugging during simulation because when the application writes to the I/O device that is being simulated by a flat address space, such as I/O device 104, a simple debugger can view all of the information that has been written to the I/O device. In contrast, debugging in the conventional fashion would be more difficult because the application keeps writing to the same address and as a result all of the history may become overwritten.

Figure 2:
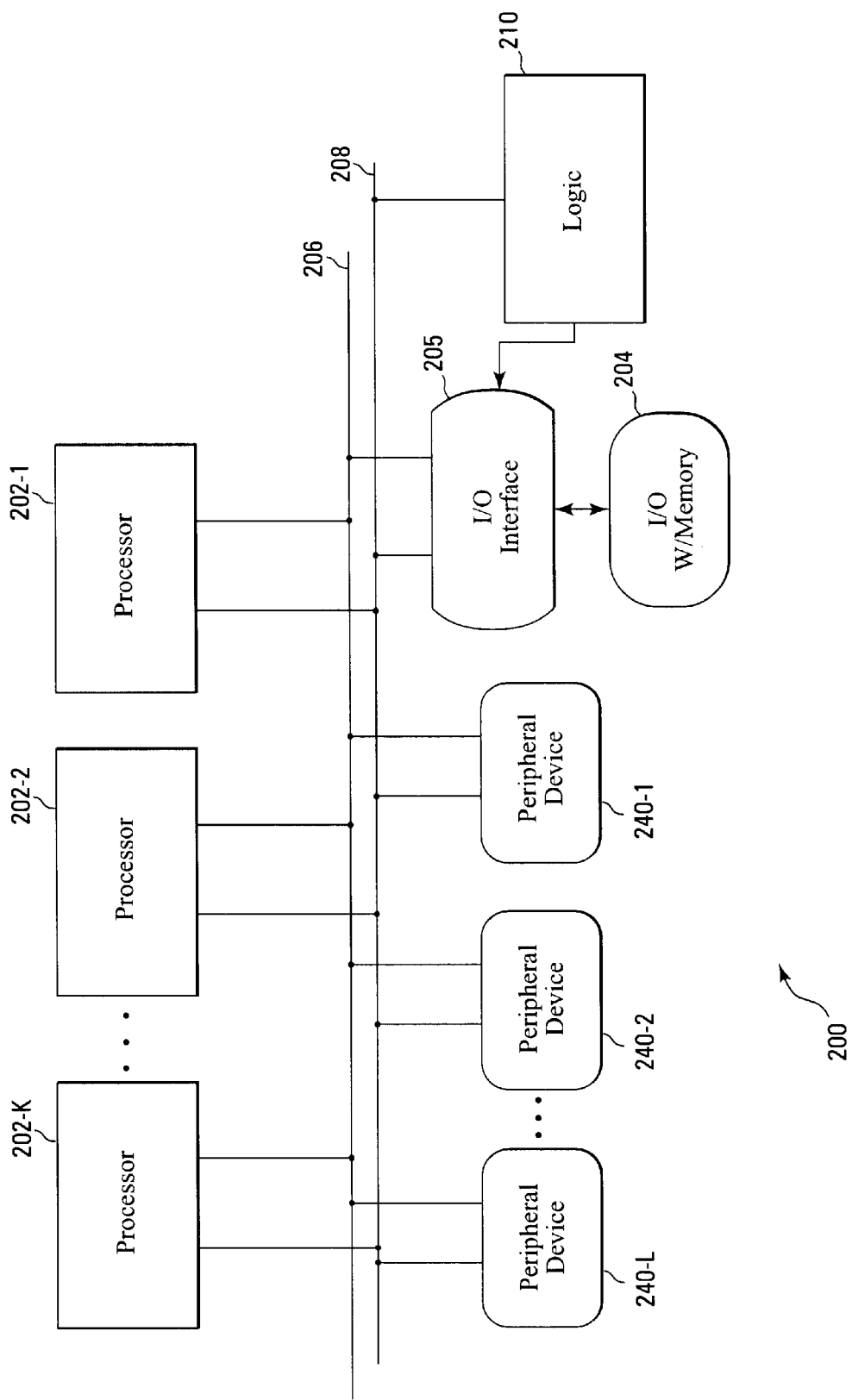
FIG. 2 is a block diagram of another embodiment of a computer system with an input/output interface according to the teachings of this invention.

FIG. 2 is a block diagram of one embodiment of a computer system indicated generally at 200 with an input/output interface 205 and constructed according to the teachings of the present invention. Computer system 200 includes a plurality of processors 202-1 to 202-K each coupled to an address bus 208 and a data bus 206. In one embodiment, address bus 208 and data bus 206 comprise a single bus that is multiplexed between address and data functions.

Computer system 200 includes an input/output (I/O) device 204 having its own memory. I/O device 204 is coupled to input/output interface 205. In one embodiment, I/O device 204 is a digital signal processor (DSP). In another embodiment, I/O device 204 is one of the family of 21ADSPXXX devices manufactured by Analog Devices Inc., Norwood, Mass., an ATM Port Control device manufactured by Lucent Technologies, Inc., Murray Hill, N.J., or the like.

Computer system 200 further includes a logic device 210 coupled to address bus 208. In one embodiment, logic device 210 comprises a programmable array logic device, a field programmable gate array device or the like. In another embodiment, logic device 210 comprises a chip select logic device. Logic device 210 monitors signals on address bus 208 and detects address signals associated with the memory of I/O device 204. In one embodiment, logic device 210 monitors signals on address bus 208 and detects address signals associated with the memories of a plurality of I/O devices.

Input/output interface 205 is coupled to address bus 208 and data bus 206. In addition, input/output interface 205 is coupled to logic device 210. In one embodiment, input/output interface 205 includes an address buffer coupled to address bus 208 and a data buffer coupled to data bus as described with respect to input/output interface 105 in FIG. 1.

In one embodiment, computer system 200 includes one or more peripheral devices 240-1 to 240-L coupled to address bus 208 and data bus 206. In one embodiment, at least one of peripheral devices 240-1 to 240-L comprises a memory device. In one embodiment, the memory device is a random access memory (RAM) device. In another embodiment, the memory device is a chip select memory device. In one embodiment, at least one of peripheral devices 240-1 to 240-L comprises an I/O device.

In operation, processors 202-1 to 202-K read from and write to the memory of I/O device 204. The memory of I/O device 204 is mapped as an address space region and logic device 210 monitors address bus 208 for I/O addresses. Logic device 210 is pre-programmed with addresses assigned to the memory of I/O device 204. In order to detect the addresses, logic device 210 decodes the addresses. When logic device 210 detects an address associated with the memory of I/O device 204, logic device 210 generates control signals that enable write to and read from operations via input/output interface 205. The control signals enable the address buffer to be driven to input/output interface 205. In one embodiment, logic device 210 is a chip select logic device and reads address information on the address bus 208 and generates a chip select signal so as to enable the input/output interface 205. In a write operation, logic device 210 enables data to be transferred to input/output interface 205. In a read operation, logic device enables input/output interface 205 to transfer data to data bus 206.

In this embodiment, logic device 210 monitors address bus 208 for signals associated with the memory of I/O device 204 from multiple processors 202-1 to 202-K as well as any peripheral devices communicating with I/O device 204. Multiple read/write tasks can communicate with I/O device 204 at the same time. Each address and read/write request is handled in sequence so as not to confuse the multiple requests. In conventional systems, without logic device 204 and I/O interface 205, there are two writes, address and data, and in some instances one task might preempt another task before both writes are completed. With this invention, logic device 204 handles the addressing in hardware and as such the read/write is atomic. As a result the requests/tasks are arbitrated.

In one embodiment, operation of computer system 100 can be simulated in a laboratory by substituting a standard memory device e.g. a random access memory device in place of input/output interface 105, I/O device 104 and logic device 110. Any errors are easily detected and corrected in the simulation process without additional software and software drivers to support communication with I/O device 104. Detecting where problems with memory overwrites take place is easily determined by placing a breakpoint on the address. Without logic device 110 and input/output interface 105 all writes would be to the same address and finding the overwrite would require much more work.

In another embodiment, operation of computer system 200 can be simulated in a laboratory by substituting a standard memory device e.g. a random access memory device in place of input/output interface 205, I/O device 204 and logic device 210. Any errors are easily detected and corrected in the simulation process without additional software and software drivers to support communication with I/O device 204 as discussed with respect to computer system 100 above.

It is understood that computer systems 100 and 200 are not restricted to an address bus and a data bus but may include any communication bus capable of transferring data and addresses between one or more devices coupled to the communication bus, e.g. memory devices, processors, logic devices and the like.

CONCLUSION

In one embodiment, an electronic system has been described. The electronic system includes a logic device and at least one input/output interface coupled to the logic device. The electronic system further includes an input/output (I/O) device with memory coupled to the at least one input/output interface, wherein the memory of the I/O device is mapped as an address space region that is directly readable and writable by a processor.

In another embodiment, an electronic system has been described. The electronic system includes a communication bus, a processor coupled to the communication bus and at least one memory device coupled to the communication bus. The electronic system further includes a logic device coupled to the communication bus and at least one input/output interface coupled to the logic device. In addition, the electronic system includes an input/output (I/O) device with memory coupled to the at least one input/output interface. The memory of the I/O device is mapped as a single address space region and the at least one memory device and the memory of the I/O device are directly readable and writable by the processor. In a further embodiment, a method of writing data to memory of a peripheral device coupled to a communication bus has been described. The memory is mapped as an address space region and the address space is writable and readable by a processor associated with the communication bus. The method includes monitoring the communication bus and decoding an address signal on the communication bus. When the address signal is associated with the memory of the peripheral device, generating at least one control signal. The method further includes providing the control signal to an input/output interface associated with the peripheral device and writing to the memory of the peripheral device.

Although specific embodiments have been illustrated and described herein, it will be appreciated by those of ordinary skill in the art that any arrangement, which is calculated to achieve the same purpose, may be substituted for the specific embodiments shown. For example, in one embodiment a logic device monitors an address or communication bus for addresses associated with the memories of a plurality of input/out devices. This application is intended to cover any adaptations or variations of the present invention. Therefore, it is intended that this invention be limited only by the claims and the equivalents thereof.

What is claimed is:

1. An electronic system, comprising:
   a logic device;
   at least one input/output interface coupled to the logic device; and
   an input/output (I/O) device with memory coupled to the at least one input/output interface, wherein the memory of the I/O device is mapped as an address space region that is directly readable and writable by a processor.

2. The system of claim 1, wherein the logic device comprises a programmable array logic device.

3. The system of claim 1, wherein the logic device comprises a field programmable gate array device.

4. The system of claim 1, wherein the logic device comprises a chip select logic device.

5. The system of claim 1, wherein the at least one input/output interface includes an input/output port.

6. The system of claim 5, wherein the input/output port includes a data port and a control signal port.

7. The system of claim 5, wherein the input/output interface includes an address buffer and a data buffer.

8. The system of claim 7, wherein the data buffer is a bi-directional buffer.

9. The system of claim 1, wherein the I/O device comprises a digital signal processor.

10. The system of claim 1, wherein the logic device is preprogrammed with the addresses assigned to the I/O device.

11. An electronic system, comprising:
    a communication bus;
    a processor coupled to the communication bus;
    at least one memory device coupled to the communication bus;
    a logic device coupled to the communication bus;
    at least one input/output interface coupled to the logic device; and
    an input/output (I/O) device with memory coupled to the at least one input/output interface, wherein the memory of the I/O device is mapped as an address space region with the at least one memory device and wherein the at least one memory device and the memory of the I/O device are directly readable and writable by the processor.

12. The system of claim 11, wherein the logic device comprises one of a programmable array logic device, a field programmable gate array device and a chip select logic device.

13. The system of claim 11, wherein the logic device is preprogrammed with the addresses assigned to the I/O device.

14. The system of claim 11, wherein the at least one memory device comprises a chip select memory device.

15. The system of claim 11, wherein the at least one of the memory device comprises a random access memory device.

16. The system of claim 11, wherein the at least one input/output interface includes an input/output port, a data port and a control signal port.

17. The system of claim 16, wherein the input/output interface further includes an address buffer and a data buffer.

18. The system of claim 11, wherein the I/O device is a digital signal processor.

19. The system of claim 11, wherein the communication bus includes a data bus and an address bus.

20. The system of claim 11, further comprising at least one other input/output device coupled to the communication bus.

21. A method of writing data to memory of a peripheral device coupled to a communication bus, wherein the memory is mapped as an address space region and the address space is writable and readable by a processor associated with the communication bus, the method comprising:
    monitoring the communication bus;
    decoding an address signal on the communication bus;
    when the address signal is associated with the memory of the peripheral device, generating at least one control signal;
    providing the control signal to an input/output interface associated with the peripheral device; and
    writing to the memory of the peripheral device.

22. The method of claim 21, wherein providing the control signal comprises enabling an address buffer to be driven to an input/output port of the input/output interface.

23. The method of claim 22, wherein providing the control signal further comprises enabling a data buffer to be driven to the input/output port.

24. A method of reading data from memory of a peripheral device coupled to a communication bus, wherein the memory is mapped as an address space region and the address space is writable and readable by a processor associated with the communication bus, the method comprising:
    monitoring the communication bus;
    decoding an address signal on the communication bus;
    when the address signal is associated with the memory of the peripheral device, generating at least one control signal;
    providing the control signal to an input/output interface associated with the peripheral device; and
    reading from the memory of the peripheral device.

25. The method of claim 24, wherein providing the control signal comprises enabling an address buffer to be driven to an input/output port of the input/output interface.

26. The method of claim 24, wherein providing the control signal further comprises enabling the input/output port to be driven to a data buffer.

* * * * *